US008872979B2

(12) United States Patent (10) Patent No.: US 8,872,979 B2
Bagga et al. (45) Date of Patent: Oct. 28, 2014

(54) COMBINED-MEDIA SCENE TRACKING FOR AUDIO-VIDEO SUMMARIZATION

(75) Inventors: Amit Bagga, Green Brook, NJ (US); Jianying Hu, Cranford, NJ (US); Jialin Zhong, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1892 days.

(21) Appl. No.: 10/153,550

(22) Filed: May 21, 2002

(65) Prior Publication Data

US 2003/0218696 A1 Nov. 27, 2003

(51) Int. Cl.
*H04N 5/14* (2006.01)
*G06F 17/30* (2006.01)
*G06K 9/18* (2006.01)
*G06K 9/62* (2006.01)
*G06K 9/00* (2006.01)
*G06K 9/72* (2006.01)
*G06F 3/01* (2006.01)
*G11B 27/28* (2006.01)
*H04N 5/073* (2006.01)
*H04N 5/445* (2011.01)

(52) U.S. Cl.
CPC .......... *G06F 17/30796* (2013.01); *H04N 5/145* (2013.01); *H04N 5/144* (2013.01); *G06K 9/18* (2013.01); *G06K 9/6202* (2013.01); *G06K 9/00664* (2013.01); *G06K 9/6218* (2013.01); *G06K 9/72* (2013.01); *G06K 9/6203* (2013.01); *G06K 9/00456* (2013.01); *G06F 3/018* (2013.01); *G06F 17/30802* (2013.01); *G06K 9/00718* (2013.01); *G11B 27/28* (2013.01); *H04N 5/073* (2013.01); *H04N 5/147* (2013.01); *H04N 5/44504* (2013.01)
USPC ........... 348/700; 348/699; 348/701; 382/182; 382/221; 382/224; 382/225; 382/229; 382/209; 382/184; 382/185; 382/176

(58) Field of Classification Search
CPC ... G06K 9/18; G06K 9/6202; G06K 9/00664; G06K 9/6218; G06K 9/72; G06K 9/6203; G06K 9/00456; G06K 3/018; H04N 5/147; H04N 5/145; H04N 5/144
USPC .......... 348/700, 699, 907, 701; 382/225, 226, 382/229, 182, 221, 224, 209, 183, 184, 185, 382/176
See application file for complete search history.

(56) References Cited

U.S. PATENT DOCUMENTS 5,293,552 A * 3/1994 Aalbersberg ................. 707/5
5,719,643 A * 2/1998 Nakajima ..................... 348/700

(Continued)

OTHER PUBLICATIONS

Rui et al, Constructing Table-of-Content for videos, Beckman Institute for Advanced Science and Technology UIUC, pp. 1-26.*
Yeung et al., "Time-constrained Clustering for Segmentation of Video into Story Units," Proceedings of ICPR, 375-380 (1996).
Jin et al., "Topic Tracking for Radio, TV Broadcast, and Newswire," Proceedings of the DARPA Broadcast News Workshop, 199-204 (Feb. 1999).

*Primary Examiner* — Shawn An

(57) ABSTRACT

Techniques are presented for analyzing audio-video segments, usually from multiple sources. A combined similarity measure is determined from text similarities and video similarities. The text and video similarities measure similarity between audio-video scenes for text and video, respectively. The combined similarity measure is then used to determine similar scenes in the audio-video segments. When the audio-video segments are from multiple audio-video sources, the similar scenes are common scenes in the audio-video segments. Similarities may be converted to or measured by distance. Distance matrices may be determined by using the similarity matrices. The text and video distance matrices are normalized before the combined similarity matrix is determined. Clustering is performed using distance values determined from the combined similarity matrix. Resulting clusters are examined and a cluster is considered to represent a common scene between two or more different audio-video segments when scenes in the cluster are similar.

19 Claims, 3 Drawing Sheets

(56) References Cited

U.S. PATENT DOCUMENTS

| | | | |
|---|---|---|---|
| 5,790,236 A * | 8/1998 | Hershtik et al. | 352/12 |
| 5,802,361 A * | 9/1998 | Wang et al. | 382/217 |
| 5,889,523 A * | 3/1999 | Wilcox et al. | 715/854 |
| 5,937,422 A * | 8/1999 | Nelson et al. | 715/206 |
| 6,100,941 A * | 8/2000 | Dimitrova et al. | 348/700 |
| 6,411,953 B1 * | 6/2002 | Ganapathy et al. | 707/6 |
| 6,735,335 B1 * | 5/2004 | Liu et al. | 382/218 |
| 6,807,306 B1 * | 10/2004 | Girgensohn et al. | 382/225 |
| 7,120,581 B2 * | 10/2006 | Kahn et al. | 704/235 |
| 7,653,925 B2 * | 1/2010 | Hull et al. | 725/37 |

\* cited by examiner

COMBINED-MEDIA SCENE TRACKING FOR AUDIO-VIDEO SUMMARIZATION

FIELD OF THE INVENTION

The present invention relates generally to audio-video summarization techniques, and more particularly, to combined-media scene tracking for audio-video summarization.

BACKGROUND OF THE INVENTION

Streaming audio-video technology has grown at such a rapid rate in recent years that there is now a constant influx of vast amounts of audio-video content into the Internet, available for access at any time from anywhere in the world. However, the abundance of audio-video data also gives rise to a significant challenge facing content providers, which is how to allow users to examine such large amount of audio-video data efficiently and receive concise representations of desired content. As a result, research on audio-video summarization has received increasing attention.

Much work on audio-video summarization to date has been carried out separately in two different research communities, each concentrating on different areas. One research community is the speech and natural language processing community. Systems in this area rely almost exclusively on the text stream associated with an audio-video segment. The text stream is usually obtained either through closed captioning or transcribed speech, although sometimes limited non-text-related audio features are also used. Various techniques have been developed to analyze the text stream and perform story boundary detection, topic detection and topic tracking in broadcast news. The tracked stories then provide the foundation for text based summarization. An exemplary article in this area is Jin et al., "Topic Tracking for Radio, TV Broadcast and Newswire," Proc. of the DARPA Broadcast News Workshop, 199-204 (1999), the disclosure of which is hereby incorporated by reference.

The image and video processing community has also vigorously pursued audio-video summarization. Here, the emphasis has been on analyzing the image sequences in an audio-video segment and segmenting or clustering images based on various measures of visual similarity. An exemplary article in this area is Yeung et al., "Time-Constrained Clustering for Segmentation of Video into Story Units," Proc. of the 13th Int'l Conf. on Pattern Recognition, 357-380 (1996), the disclosure of which is hereby incorporated by reference.

While such text and video processing techniques have helped in audio-video summarization, these techniques still could be improved. A need therefore exists for techniques that improve upon the text and video processing techniques currently in use.

SUMMARY OF THE INVENTION

Broadly, techniques are presented for analyzing audio-video segments, usually from multiple sources. In one aspect of the invention, a combined similarity measure is determined from text similarities and video similarities. The text and video similarities measure similarity between audio-video scenes for text and video, respectively. The combined similarity measure is then used to determine similar scenes in the audio-video segments. When the audio-video segments are from multiple audio-video sources, the similar scenes are common scenes in the audio-video segments. For instance, if the audio-video segments are from two or more news programs, then the similar scenes are scenes common to the news programs.

In another aspect of the invention, the text and video similarities are represented as similarity matrices, where each element of a matrix compares one scene with another scene. For instance, an element of the text similarity matrix might compare one scene from one audio-video segment with another scene from a different audio-video segment. In this aspect, the combined similarity measure is a combined similarity matrix determined from the text and video similarity measures.

In another aspect of the invention, the similarity is converted to, or measured by, distance. Thus, distance matrices are derived from similarity matrices. In yet another aspect, the text and video distance matrices are normalized before the combined similarity matrix is determined. In another aspect, clustering is performed using distance values determined from the combined similarity matrix. Resulting clusters are examined and a cluster is considered to represent a common story between two or more different audio-video programs or sources when scenes from multiple sources or programs are present in the cluster.

A more complete understanding of the present invention, as well as further features and advantages of the present invention, will be obtained by reference to the following detailed description and drawings.

DETAILED DESCRIPTION OF PREFERRED EMBODIMENTS

Figure 1:
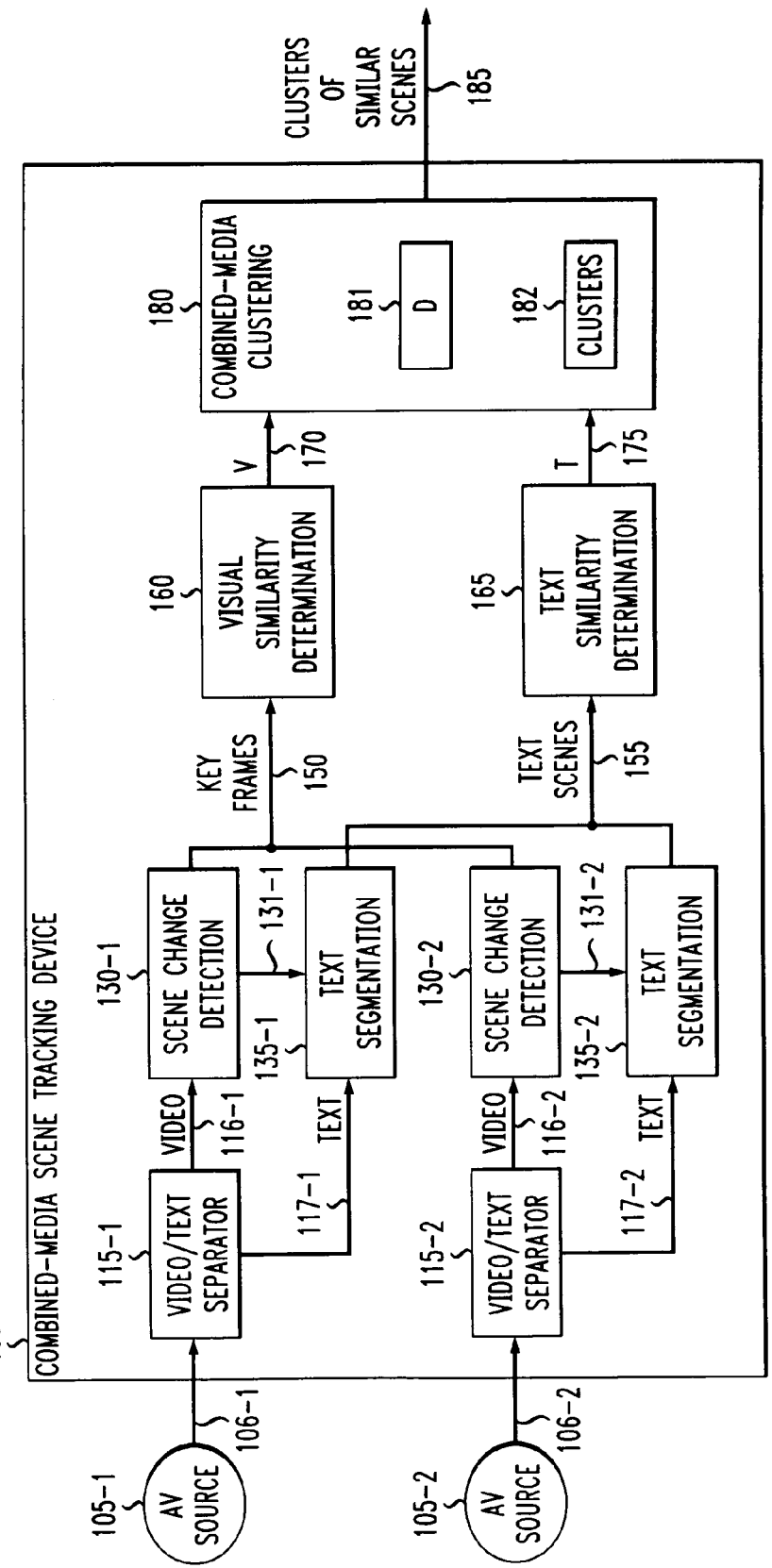
FIG. 1 illustrates a block diagram of an exemplary system used to perform combined-media scene tracking and summarization in accordance with a preferred embodiment of the invention.

The following detailed description is divided into several sections in order to facilitate an organized description of the embodiments of the present invention. In Section 1, an introduction is given; Section 2 describes scene change detection; Section 3 describes text-based topic tracking; Section 4 describes visual scene comparison; Section 5 describes combined-media clustering; Section 6 describes a non-linear distance combination; and Section 7 describes a computer system suitable for implementing the aspects of the invention.

1. Introduction

Along with the problems previously discussed, there are additional problems with conventional audio-video analysis and summarization. For instance, since the video and audio (e.g., closed captioning) streams are synchronized in an audio-video segment to present coherent stories, there is an inherent correlation between these streams. Combining video and text analyses would allow a system to exploit such correlation to improve the segmentation and tracking of scenes, thus leading to better summarization. It would also allow the creation of multimedia representations of stories or "concepts," thus enabling more powerful indexing and better organization of large video collections. However, conventional systems do not take advantage of the inherent correlation.

Another type of correlation that has not yet been fully explored is the correlation between different audio-video collections with overlapping stories. Such correlation is particularly common in broadcast news. Very often, the top news stories of the day are reported by every major network station. While each station's presentation may have different components (such as a different anchor person or a different field interviewer), the most important footages are often shared. Furthermore, the same story often gets repeated with minor modification at different times by the same station. Exploring such redundancies would allow identification of the major stories of the moment and provide summaries that capture the essence of these stories (e.g., by grouping together the most often shared scenes). The parallel to this approach in text analysis is multi-article summarization, which has been shown to perform much better than single-article based summarization. Again, such summarization is not currently performed by conventional systems.

Besides summarization, multi-source video analysis has other applications such as multi-lingual story tracking. Once a major story is identified, one can derive reliable visual representations (e.g., in the form of an image sequence) of the story by pooling together related segments from all sources and use such representation to extract the same story from foreign news programs without the need for machine translation.

Techniques are presented herein that solve the problems of conventional text and video analyses. In particular, aspects of the present invention combine both video and text analyses on multiple sources of video to identify major stories in broadcast news. In one embodiment, scene-change detection is initially performed. The resulting scenes are then compared against each other in two different media: in closed captioned using a text-based topic tracking technique that determines text similarities; and in video using a perceptually based image similarity. The scenes are than clustered by combining evidence from both media, a process referred to herein as combined-media scene clustering. Finally, dominant clusters containing scenes from multiple sources are identified as major news stories.

Turning now to FIG. 1, a combined-scene tracking device 100 is shown accepting audio-video from two exemplary audio-video sources 105-1 and 105-2 (collectively, "audio-video sources 105") and producing a number of clusters of similar scenes 185. It should be noted that there could be many audio-video sources 105, and not just two as shown in FIG. 1. Two audio-video sources 105 were chosen for simplicity. Clusters of similar scenes 185 are the common scenes between the audio-video sources 105, as determined by similarity measures. FIG. 1 is used herein to give an overview of the operation of aspects of the present invention, and more detailed description follows in reference to FIG. 2. Although the term "video" is generally associated with a source that contains both images and sound, an effort is made herein to refer to segments having both images and sound as "audio-video" segments. The term "video" will be used to denote a series of one or more images from an audio-video segment, and "audio" will denote the sounds that accompany an audio-video segment. Additionally, an "audio-video segment" comprises a long portion of audio-video from one or more sources. The sources will generally be multiple sources, such as different television channels, like the National Broadcasting Corporation (NBC) and the Public Broadcasting System (PBS).

Combined-scene tracking device 100 comprises video/text separators 115-1 and 115-2 (collectively, video/text separators 115), scene change detection modules 130-1 and 130-2 (collectively, "scene change detection modules 130"), text segmentation modules 135-1 and 135-2 (collectively, "text segmentation modules 135"), a visual similarity determination module 160, a text similarity determination module 165, and a combined-media clustering module 180. The combined-media clustering module 180 comprises combined similarity matrix 181 and clusters 182.

Audio-video 106-1 and 106-2 (collectively "audio-video 106") from audio-video sources 105 are input to video/text separators 115, which separate the audio-video 106 into video 116-1 and 116-2 (collectively, "video 116") and text 117-1 and 117-2 (collectively, "text 117"). As described in more detail below, scene change detection modules 130 use video processing techniques to determine video scenes in the audio-video 106. It should be noted that video 116 may contain audio, closed captioning, or other data that is usually ignored by scene change detection module 130. Text 117 may be determined from audio-video 106 through speech-to-text conversion by video/text separators 115 or by extracting closed captioning from the audio-video 106. Speech-to-text conversion is discussed in more detail by Gillick et al., "Dragon Systems' Automatic Transcription of New TDT Corpus," Proc. of Broadcast News Transcription and Understanding Workshop (1998), the disclosure of which is hereby incorporated by reference. In the examples given below, closed captioning is used, but speech-to-text conversion may also be used.

When scene change detection 130 determines scene changes, it sends scene change information 131-1 and 131-2 (collectively, "scene change information 131") to text segmentation modules 135. Such scene change information 131 generally indicates at least the starting frame for scenes. The scene change information 131 may contain the ending information for scenes, although the ending information can be determined from the starting information. The scene change information 131 will usually be frame numbers, such as "frame 311." Additionally, time may be used to augment or replace the frame numbers. Text segmentation modules 135 use the scene change information 131 to segment text 117 into text scenes 155 that correspond to video scenes.

Scene change detection modules 130 use well known techniques to determine when scene changes exist. This is discussed in more detail below. A "scene" is usually technically defined as the smallest coherent unit in a portion of audio-video. Generally, to determine scenes, first scene changes are determined. Then audio-video between two scene changes is considered a "scene." Because scene change determination is not always correct, there may be minor differences between the scenes determined through scene change techniques and what are actually scenes as determined by the smallest coherent units in a portion of audio-video. For the purposes of the present invention, these differences are not significant, and any audio-video designated as a "scene" should be suitable for use with the present invention.

In one embodiment, in order to enable faster comparisons between scenes, the scene change detection modules 130 choose key frames 150 from the scenes. Each scene will have a key frame chosen that is then used in comparisons with other key frames from other scenes. The similarity of the key frames 150 thus determines whether scenes will be considered as visually similar. In one embodiment of the present invention, a frame in approximately the middle of the scene is chosen as a key frame.

Visual similarity determination module 160 compares key frames 150 to determine and output a video similarity matrix 160, denoted as V in FIG. 1. Video similarity matrix 170 comprises a number of elements (not shown), each element having a value that determines the similarity between two scenes from audio-video sources 105. For instance, if there are two scenes in each of the audio-video sources 105, then an exemplary video similarity matrix 170 is as follows:

$$V = \begin{bmatrix} v_{11} & v_{12} & v_{13} & v_{14} \\ v_{21} & v_{22} & v_{23} & v_{24} \\ v_{31} & v_{32} & v_{33} & v_{34} \\ v_{41} & v_{42} & v_{43} & v_{44} \end{bmatrix},$$

where $v_{ij}$ is the similarity based on the i-th and the j-th scenes, the subscript "1" is equated with the first scene from the audio-video source 105-1, the subscript "2" is equated with the second scene from the audio-video source 105-1, the subscript "3" is equated with the first scene from the audio-video source 105-2, and the subscript "4" is equated with the second scene from the audio-video source 105-2. In this example, V is an N×N matrix, where N is the total number of scenes from all audio-video sources 105.

It should also be noted that similarities for both video and text may also be measured by a distance. The term "similarity" encompasses the term "distance" because they are related. For instance, two key frames that are exactly identical will have a very high similarity and a very low distance. Generally, the distance may be determined by d=1−s, where d is a value of distance, s is a value of similarity, and both d and s are normalized to [0,1]. Therefore, distance measures similarity, except that the values of each measurement will be different.

Text similarity determination module 165 produces text similarity matrix 175, denoted as T in FIG. 1. The text similarity matrix 175 has the same elements in the same order as video similarity matrix 170.

Combined-media clustering module 180 determines a combined similarity matrix 181, denoted as matrix D in FIG. 1, from text similarity matrix 175 and video similarity matrix 180. This combined similarity matrix 181 is then used to perform combined-media clustering, where clusters 182 are created. The clustering is performed using known techniques and is described in more detail below. The combined-media clustering module 180 determines clusters of similar scenes 185 by examining clusters 182 and determining which clusters, if any, contain scenes from multiple sources. The clusters that contain scenes from multiple sources are then output by combined-media clustering module 180 as clusters of similar scenes 185. These clusters include whatever information is necessary to determine a scene, such as starting and ending video frames. Also, text associated with the scenes may be output, if desired.

It should be noted that video/text separator modules 115 will generally be implemented as a single module. For instance, in an object-oriented computer system, a class would define a "generic" video/text separator module 115, and two objects (i.e., 115-1 and 115-2) would be instantiated from the class. Each instantiated object would then operate on its associated audio-video source 105 and audio-video 106. Similarly, scene change detection modules 130 and text segmentation modules 135 would be similarly designed as singular entities. However, it is possible to design completely separate modules, if desired.

To summarize, FIG. 1 shows a combined-media scene tracking device 100 that accepts audio-video from multiple audio-video sources or programs from the same audio-video source, or a combination of these, and that outputs similar scenes that occur in the different sources and programs. This is summarization, because potentially massive amounts of audio-video are examined and the most important scenes, which generally contain stories of some type, are output.

Figure 2:
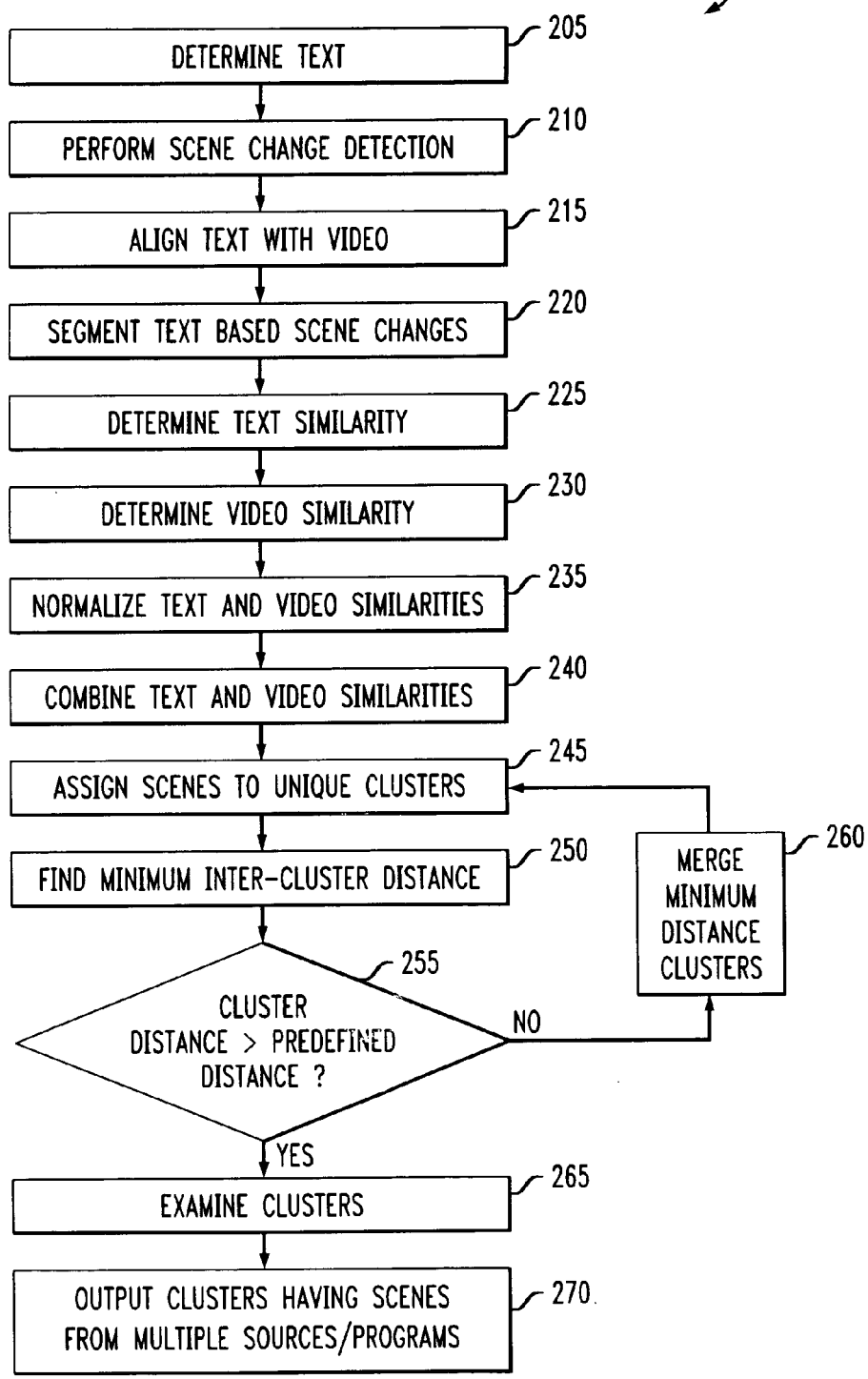
FIG. 2 illustrates a flow chart of a method used to perform combined-media scene tracking and summarization in accordance with a preferred embodiment of the invention.

Referring now to FIG. 2, a method 200 is shown for combined-media tracking. Method 200 is performed by combined-media tracking device 100 or another suitable device. Many of the steps associated with method 200 are described in the sections below.

Method 200 begins when text is determined in step 205. As described previously, text may be determined through speech-to-text conversion or by closed captioning, or even a combination of these.

2. Scene-Change Detection

In step 210, scene change detection is performed. Video scene change detection is a well-studied topic. For instance, see Ahanger et al, "A survey of Technologies for Parsing and Indexing Digital Video," J. of Visual Communications and Image Representations, 7(1):28-43 (1996), the disclosure of which is hereby incorporated by reference. For aspects of the present invention, recall is more important than precision because false boundaries can be eliminated in later analysis. As is known in the art, there are two types of errors associated with scene change detection. The first error is where a scene change is missed. The second error is a false positive, where a scene change is determined to exist where none actually exists. Recall measures how many of the real scene changes an algorithm was able to detect. Precision measures the percentage of real scene changes occur out of the scene changes that the algorithm detects. For aspects of the present invention, superfluous scene changes, such as those created through false positives, will generally be eliminated by the combined processing techniques described herein. Consequently, recall is more important than precision.

The scene change detection of step 201 is illustratively performed in three steps (not shown in FIG. 2). First, scene change candidates are detected by using a spatial statistical analysis method. Then these candidates are clustered temporally to identify scene cuts. Finally, key frames are selected between scene boundaries.

A statistical scene change detection method suitable for use with the present invention is described in Lei et al., "Video Segmentation Using Spatial and Temporal Statistical Analysis," Proc. of IEEE Int'l Conf. on Multimedia and Expo, 1527-1530 (2000), the disclosure of which is hereby incorporated by reference. As per Lei, using the DC term of 8×8 macro blocks, a video frame is first sub-sampled by eight in horizontal and vertical directions. Histograms of sub-sampled video frames are used as image features. A $T^2$ test is then performed to detect if a change in feature distribution has occurred. For aspects of the present invention, instead of using the two pass detection method described in Lei, it is beneficial to lower the threshold for the $T^2$ test so higher recall is achieved. Since the threshold is low, there are clusters of candidates for scene changes at each gradual change location. A hierarchical clustering method, such as the hierarchical clustering methods described in more detail in reference to step 245, is used to cluster these candidates along the temporal axis into groups such that the between-group distance (e.g., in terms of time lapse) is larger then a preset threshold. Then, within each group, a scene change boundary is set at the point with the largest feature distribution change. The midpoint between two consecutive scene changes is chosen as the key frame to avoid the overlapping frames caused by gradual scene changes. The midpoint of two consecutive scene changes will generally not have fade in or fade out and is, consequently, more representative of a scene.

3. Text-Based Topic Tracking

In step 215, the closed caption track (or other text) associated with the video is aligned with the scene changes identified. The text is then partitioned at each scene boundary in step 220. This alignment is not perfect, as the closed caption usually lags behind the scenes. However, it is beneficial to approximate the amount of lag in order to achieve better alignment.

The closed caption text associated with every scene in one or more programs from one or more sources is then used to calculate the similarities between the closed caption associated with each pair of scenes in step 225. In one embodiment, distances are used for the similarities. For the remainder of this section, the closed caption associated with every scene will be referred to simply as "text scenes." In step 225, every text scene is compared to every other text scene in the collection. For each pair of text scenes, a real number is determined between zero and one that represents the distance between the text scenes, with zero implying that the two text scenes are the same, and one implying that there is nothing in common between the text scenes. The real number is a measure of distance. The distance between text scenes is computed as 1—similarity where the value of similarity may be computed using a vector space model, which is described in Salton, "Automatic Text Processing: The Transformation, Analysis, and Retrieval of Information by Computer" (1989), the disclosure of which is hereby incorporated by reference. Other suitable techniques may also be used.

Note that similarity and distance move oppositely, in that the more similar are two text scenes (or video scenes), the less distance there is between the two scenes.

As described in Salton, in the vector space model, each text scene is stored as a vector of terms. The terms in the vector are in their morphological root form obtained using Porter's stemmer, and are filtered for stop-words. Porter's stemmer is described in Porter, "An Algorithm for Suffix Stripping," Program, 14(3):130-137 (1998), the disclosure of which is hereby incorporated by reference. If $S_1$ and $S_2$ are the vectors for the two text scenes, then their similarity is computed as $Sim(S_1,S_2)=\Sigma_{commonterms_{ij}} w_{1_j} \times w_{2_j}$, where $t_j$ is a term present in both $S_1$ and $S_2$, $w_{1_j}$ is the weight of the term $t_j$ in $S_1$, and $w_{2_j}$ is the weight of $t_j$ in $S_2$.

The weight of a term $t_j$ in the vector $S_i$ for a text scene is given by the following:

$$w_{ij} = \frac{t_f \cdot \log\frac{N}{df}}{\sqrt{s_{i1}^2 + s_{i2}^2 + \ldots + s_{in}^2}},$$

where $t_f$ is the frequency of the term $t_j$ in the text scene, and N is the total number of non-empty text scenes in the collection being examined. An empty text scene is a scene with no speech or closed captioning. The term df is computed by analyzing the closed caption associated with a collection of 18 different programs, and df is the number of programs in the collection that the term $t_j$ occurs in. More or less programs than 18 may be chosen. The term $\sqrt{s_{i1}^2 + s_{i2}^2 + \ldots + s_{in}^2}$ is the "cosine normalization factor," and is equal to the Euclidean length of the vector $S_i$ where $s_{in}^2$ equals the square of the product $$t_f \times \log\frac{N}{df}$$

for the term $t_n$ in vector $S_i$.

4. Visual Scene Comparison

In step 230, the video similarities are determined. The video similarity between two scenes is represented, in one embodiment, by the distance between two corresponding key frames. Any other technique suitable for measuring the similarity between two video scenes may be used. To measure the visual distance between two key frames, a metric based on color composition matching is suitably chosen because it is perceptually based.

The first step of color distance computation is to obtain compact, perceptually relevant representation of the color content of a key frame. It has been shown that on the global level, humans perceive images only as a combination of a few most prominent colors, even though the color histogram of the observed image might be very busy." In this regard, see Mojsolovic et al, "Matching and Retrieval Based on the Vocabulary and Grammar of Color Patterns," IEEE Trans. Image Proc., 9(1):38-54 (2000), the disclosure of which is hereby incorporated by reference. Based on this finding, the perceived colors are extracted through the following steps. First a key frame is transformed from the Red-Green-Blue (RGB) space into the perceptually more uniform L*a*b color space. This transformation is described in more detail in Wyszecki et al., "Color Science: Concepts and Methods, Quantitative Data and Formulae" (1982), the disclosure of which is hereby incorporated by reference. The set of all possible colors is then reduced to a subset defined by a compact color codebook. Finally, a statistical method is applied to identify colors of speckle noise and remap them to the surrounding dominant color. The statistical method and subsequent remapping are described in Hu et al., "Optimal Color Composition Matching of Images," Proc. 15th Int'l Conf. on Pattern Recognition, vol. 4, 47-51 (2000), the disclosure of which is hereby incorporated by reference.

Once the perceptually dominant colors are extracted, each color component is represented as a pair $CC_i(I_i, P_i)$, where $I_i$ is the index to a color in a particular color codebook and $P_i$ is the area percentage occupied by that color. A color component $CC_i$ is considered to be dominant if $P_i$ exceeds a threshold, which is typically two to three percent. Based on human perception, two images are considered similar in terms of color composition if the perceived colors in the two images are similar, and similar colors also occupy similar area percentage. See Mojsolovic, already incorporated by reference above. A metric called Optimal Color Composition Distance (OCCD) is used to capture both criteria. This metric is computed through an efficient search for the optimal mapping between the two corresponding sets of dominant color components, and has been shown to produce robust and perceptually superior results. The reference Hu, incorporated by reference above, shows that this metric produces robust results.

5. Combined-Media Scene Clustering

Given a collection of scenes, two distance matrices are computed using the two similarity measures described above, one based on textual correlation and the other on image correlation. As described above, these matrices are, in one embodiment, the text distance matrix, T, and video distance matrix, V, respectively. To perform combined-media scene clustering, the two distance matrices are combined into a single distance matrix, D, and hierarchical clustering is then applied on D. Compared to a conventional approach, where clustering is applied on T and V separately, then the results are analyzed for correlations, the combined matrix approach has an advantage that evidence from different sources is integrated at an earlier stage and the approach is therefore more effective.

Before T and V can be linearly combined, normalization should be performed to ensure that the two distances have comparable dynamic range and distribution. Normalization is performed in step 235. Any technique for normalizing the similarity measures may be used. In one embodiment, to normalize the two matrices, histogram analysis is conducted on data collected from, for example, one hour of broadcast news programs. For the histogram analysis, distances are placed on the abscissa and the number of times the distance occurs in the one hour of broadcast new is placed on the ordinate. It has been discovered that, although the two distances have very different dynamic ranges, they do exhibit similar distribution curves. To be more specific, in both cases there are a very small number of instances of relatively small distance values, then the number of instances increase rapidly as the distance value increases. In other words, there tends to be more dissimilar text or video scenes than similar text or video scenes.

This simplifies the normalization task somewhat, as the dynamic range simply needs to be adjusted through translation and scaling. In other words, two parameters are determined to normalize each distance. To accomplish this, two values, m and a, are identified for each distance using statistics collected from the one hour of news programs. The element m is the maximum distance value after removing outliers. To remove the outliers, a histogram of distances is computed using a large number of examples. Then the largest five percent of the values are removed. The element a is the value below which the two corresponding text or image scenes are considered to be very similar, and is chosen manually by examining a large number of examples. The translation and scaling parameters for each distance are then uniquely determined such that m is mapped to 1.0 and a is mapped to 0.1.

Specifically, the parameters in V'=xV+y are determined by the following: x=0.9/(m−a); and y=(0.1m−a)/(m−a). The normalized textual and visual distance matrices are denoted T' and V' respectively, and the combined distance matrix D is computed, in one embodiment, as a linear combination of the two: D=wV'+(1−w)T'. This combining occurs in step 240.

Hierarchical clustering (steps 245 through 260) is then applied using the distance values taken from matrix D. Hierarchical clustering is described in Jain et al., "Algorithms for Clustering Data" (1988), the disclosure of which is hereby incorporated by reference. First each scene is assigned to a unique cluster (step 245). The "complete linkage" method (see Jain) is used to compute inter-cluster distances (step 250), and the two clusters with the minimum inter-cluster distance are determined (step 250). If the minimum inter-cluster distance is not greater than a predefined distance (step 255=NO), the two clusters with the minimum inter-cluster distances are merged into a new cluster (step 260). This merging process is repeated recursively until a predefined between cluster distance is reached in step 255 (step 255=YES). Then, the resulting clusters are examined (step 265) and a cluster is considered to represent a major news story if it contains scenes from multiple sources (e.g., news programs on different channels) or multiple programs (e.g., news programs on the same channel). Clusters having scenes from these sources or programs are output in step 270. As previously described, a cluster will generally indicate the audio-video source and the starting and ending frame of a scene. Additionally, the frames, audio, text or combinations of these may be output.

6. Non-Linear Distance Combination

The combination technique described above to determine the single similarity matrix D from the text similarity matrix T and the video similarity matrix V is linear. However, other combination techniques may be used. This section describes an exemplary non-linear distance combination technique.

Let $\tilde{V} = [\tilde{v}_{ij}]_{N \times N}$ and $\tilde{T} = [\tilde{t}_{ij}]_{N \times N}$ represent the video distance matrix and the text distance, respectively, where N is the total number of scenes from all programs under consideration. The element $\tilde{d}_{ij}$ in the non-linearly combined distance matrix $$\tilde{D} = [\tilde{d}_{ij}]_{N \times N}$$

is defined as following:

$$d_{ij} = \frac{1}{1+e^{-\alpha(\tilde{t}_{ij}-t_0)}} \tilde{t}_{ij} + \frac{e^{-\alpha(\tilde{t}_{ij}-t_0)}}{1-e^{-\alpha(\tilde{t}_{ij}-t_0)}} \tilde{v}_{ij},$$

where $\alpha$ and $t_0$ are preset parameters ($\alpha$=2.0, $t_0$=0.2 in an exemplary system) determined experimentally. It should be noted that alpha cannot be too large, otherwise the formula becomes non-monotonic (meaning that $d_{ij}$ could decrease while $t_{ij}$ or $v_{ij}$ increases). Other than this limitation, values of $\alpha$ and $t_0$ may be determined by selecting values for these parameters and checking to see how well the resulting distances correspond to human judgement.

Using the formula for $d_{ij}$, the weights used to combine the video and text based distances vary based on the text based distance. When the text based distance is large, the combined distance is dominated by the text based distance, which ensures that images about different topics will not be clustered together. As the text based distance decreases, more and more weight is given to the image based distance to distinguish images on the same topic but from different footages. This formula is particularly effective when the text source has little noise and there is good alignment between scenes and the accompanying text. Under such conditions, the text based distance matrix tends to have high reliability. On the other hand, when the text source is very noisy (e.g. when it is obtained from transcribed speech), the simple linear combination formula is expected to perform better.

7. Exemplary Computer System

Figure 3:
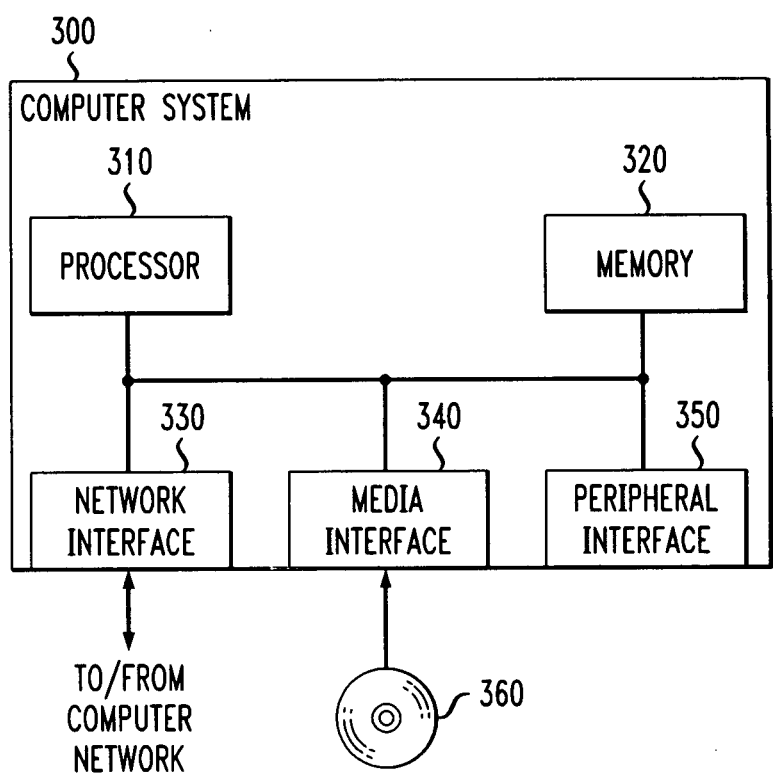
FIG. 3 is a block diagram of a computer system suitable for implementing the system of FIG. 1 and the method of FIG. 2.

Turning now to FIG. 3, a block diagram is shown of a computer system 300 for performing the methods and techniques of a combined-media tracking device 100 and method 200 in accordance with one embodiment of the present invention. Computer system 300 is shown interacting with a Digital Versatile Disk (DVD) 360 and a computer network. Computer system 300 comprises a processor 310, a memory 320, a network interface 330, a media interface 340 and a peripheral interface 350. Network interface 330 allows computer system 300 to connect to a network (not shown), while media interface 340 allows computer system 300 to interact with media such as a hard drive or DVD 360. Peripheral interface 350 allows humans to interact with computer system 100 through peripherals such as (not shown) mice, keyboards, and monitors.

As is known in the art, the methods and apparatus discussed herein may be distributed as an article of manufacture that itself comprises a computer-readable storage device or medium having computer-readable code means embodied thereon. The computer-readable program code means is operable, in conjunction with a computer system such as computer system 300, to carry out all or some of the steps to perform the methods or create the apparatuses discussed herein. The computer-readable storage device or medium may be a recordable medium (e.g., floppy disks, hard drives, optical disks such as DVD 360, or memory cards) or may be a transmission medium (e.g., a network comprising fiber-optics, the world-wide web, cables, or a wireless channel using time-division multiple access, code-division multiple access, or other radio-frequency channel). Any device or medium known or developed that can store information suitable for use with a computer system may be used. A computer-readable storage or device expressly excludes signals per se and the like.

The computer-readable code means is any mechanism for allowing a computer to read instructions and data, such as magnetic variations on a magnetic medium or height variations on the surface of a compact disk, such as DVD 350.

Memory 320 configures the processor 310 to implement the methods, steps, and functions disclosed herein. The memory 320 could be distributed or local and the processor 310 could be distributed or singular. The memory 320 could be implemented as an electrical, magnetic or optical memory, or any combination of these or other types of storage devices. Moreover, the term "memory" should be construed broadly enough to encompass any information able to be read from or written to an address in the addressable space accessed by processor 310. With this definition, information on a network, accessible through network interface 330, is still within memory 320 because the processor 310 can retrieve the information from the network. It should be noted that each distributed processor that makes up processor 310 generally contains its own addressable memory space. It should also be noted that some or all of computer system 300 can be incorporated into an application-specific or general-use integrated circuit.

It is to be understood that the embodiments and variations shown and described herein are merely illustrative of the principles of this invention and that various modifications may be implemented by those skilled in the art without departing from the scope and spirit of the invention.

The invention claimed is:

1. A method, comprising:
   extracting first text from a first video segment and second text from a second video segment;
   identifying topics within the first text and the second text;
   comparing the first text with the second text to yield a textual comparison;
   generating, via a processor, a contextual similarity measure between the first video segment and the second video segment based on the first video segment, the second video segment, the textual comparison, and the topics;
   generating, via the processor, a visual similarity measure based on video similarity of the first video segment and the second video segment;
   based on the contextual similarity measure and the visual similarity measure, determining a combined similarity score, represented as a combined distance measure, for the first video segment and the second video segment, wherein the contextual similarity measure is converted to a normalized text distance and the visual similarity measure is converted to a normalized video distance; and
   outputting the combined similarity score.

2. The method of claim 1, wherein the first video segment and the second video segment originate from a single audio-video source.

3. The method of claim 1, wherein the first video segment and the second video segment originate from a plurality of separate audio-video sources.

4. The method of claim 3, wherein identifying the topics comprises:
   (i) comparing the first text with the second text to produce a text similarity value; and
   (ii) performing step (i) for each video segment of the plurality of separate audio-video sources with every other video segment of the plurality of separate audio-video sources.

5. The method of claim 4, wherein identifying the topics further comprises:
   (iii) setting the text similarity value corresponding to a video segment to a predetermined value;
   (iv) performing step (iii) until each text similarity value for every video segment has been set to the predetermined value.

6. The method of claim 1, wherein extracting the first text and the second text comprises using text corresponding to the first video segment and the second video segment.

7. The method of claim 1, wherein extracting the first text and the second text comprises obtaining the first text and the second text through speech-to-text conversion.

8. The method of claim 1, wherein extracting the first text and the second text comprises obtaining the first text and the second text by accessing closed captioning data.

9. The method of claim 1, wherein generating the visual similarity measure comprises using video corresponding to the first video segment and the second video segment.

10. The method of claim 1, further comprising:
    detecting scene changes in the first video segment and the second video segment; and
    marking each scene change detected in the first video segment and the second video segment.

11. The method of claim 10, further comprising determining text corresponding to the each scene change.

12. The method of claim 1, further comprising determining, for each of the first video segment and the second video segment an image as a key frame.

13. The method of claim 1, wherein the normalized text distance is stored in a first matrix, the normalized video distance is stored in a second matrix, and the combined distance measure is stored in a third matrix.

14. The method of claim 1, wherein determining the combined similarity score comprises linearly combining the normalized text distance and the normalized video distance to create the combined distance measure.

15. The method of claim 1, wherein determining the combined similarity score comprises combining the normalized text distance and the normalized video distance through a non-linear equation to create the combined distance measure.

16. The method of claim 15, further comprising:
    clustering video segments based on the visual similarity measure and the contextual similarity measure; and
    determining clusters having audio-video scenes corresponding to a plurality of audio-video segments, whereby the audio-video scenes corresponding to a single cluster are considered similar portions of the plurality of audio-video segments.

17. The method of claim 16, wherein clustering the video segments further comprises:
- assigning each of the audio-video scenes to a unique cluster;
- determining, based on the combined distance measure, a minimum inter-cluster distance between two clusters of the clusters;
- when the minimum inter-cluster distance is not greater than a predefined distance, merging the two clusters and determining a new minimum inter-cluster distance; and
- when the minimum inter-cluster distance is greater than the predefined distance, stopping clustering.

18. A system comprising:
- a processor; and
- a non-transitory computer-readable storage device storing a computer program which, when executed by the processor, causes the processor to perform operations comprising:
  - extracting first text from a first video segment and second text from a second video segment;
  - identifying topics within the first text and the second text;
  - comparing the first text with the second text to yield a textual comparison;
  - generating a contextual similarity measure between the first video segment and the second video segment based on the first video segment, the second video segment, the textual comparison, and the topics;
  - generating a visual similarity measure for the first video segment and the second video segment based on video similarity;
  - based on the contextual similarity measure and the visual similarity measure, determining a combined similarity score, represented as a combined distance measure, for the first video segment and the second video segment, wherein the contextual similarity measure is converted to a normalized text distance and the visual similarity measure is converted to a normalized video distance; and
  - outputting the combined similarity score.

19. A non-transitory computer-readable storage device storing a computer program which, when executed by a processor, causes the processor to perform operations comprising:
- extracting first text from a first video segment and second text from a second video segment;
- identifying topics within the first text and the second text;
- comparing the first text with the second text to yield a textual comparison;
- generating a contextual similarity measure between the first video segment and the second video segment based on the first video segment, the second video segment, the textual comparison, and the topics;
- generating a visual similarity measure based on video similarity of the first video segment and the second video segment;
- based on the contextual similarity measure and the visual similarity measure, determining a combined similarity score, represented as a combined distance measure, for the first video segment and the second video segment, wherein the contextual similarity measure is converted to a normalized text distance and the visual similarity measure is converted to a normalized video distance; and
- outputting the combined similarity score.

* * * * *